United States Patent [19]
Nagano et al.

[11] 4,086,411
[45] Apr. 25, 1978

[54] METHOD OF REMOVING VINYL CHLORIDE MONOMER FROM A VINYL CHLORIDE POLYMER

[75] Inventors: Mineo Nagano; Koji Tanaka, both of Yokkaichi, Japan

[73] Assignee: Toyo Soda Manufacturing Co., Ltd., Japan

[21] Appl. No.: 639,051

[22] Filed: Dec. 9, 1975

[30] Foreign Application Priority Data

Dec. 13, 1974 Japan .................................. 49-142449

[51] Int. Cl.$^2$ .................................................. C08F 6/00
[52] U.S. Cl. .................................... 528/480; 526/344; 528/501; 528/503
[58] Field of Search ...................... 204/159.14, 159.22, 204/159.17; 528/501, 503, 480; 526/344

[56] References Cited

U.S. PATENT DOCUMENTS

| B 313,029 | 1/1975 | Lidel | 204/159.14 X |
|---|---|---|---|
| 2,050,595 | 8/1936 | Wolfe | 204/159.22 X |
| 2,945,795 | 7/1960 | Cummin | 204/158 |
| 2,979,492 | 6/1957 | Governale | 526/344 X |
| 3,188,265 | 6/1965 | Charbonneau | 204/159.14 X |
| 3,787,187 | 1/1974 | DeWitt | 526/344 X |
| 3,846,521 | 11/1974 | Osterholtz | 264/22 |

FOREIGN PATENT DOCUMENTS 1,226,988  3/1971  United Kingdom ............ 204/159.14

Primary Examiner—Christopher A. Henderson, Jr.
Attorney, Agent, or Firm—Oblon, Fisher, Spivak, McClelland & Maier

[57] ABSTRACT

A method of removing vinyl chloride monomer which remains in a polymer of vinyl chloride, which comprises irradiating the polymer of vinyl chloride with a high energy electromagnetic wave to excite the vinyl chloride monomer in said polymer to remove unreacted monomer.

4 Claims, No Drawings

METHOD OF REMOVING VINYL CHLORIDE MONOMER FROM A VINYL CHLORIDE POLYMER

BACKGROUND OF THE INVENTION

1. Field of the Invention

The present invention relates to a method of removing vinyl chloride monomer which remains in a polymer. More particularly, it relates to a method of removing vinyl chloride monomer which remains in a polymer of vinyl chloride such as vinyl chloride homo- or copolymers.

2. Description of the Prior Art

Recently, the toxicity of vinyl chloride to the human body has become a serious problem. It has been required by government agencies that the escape of vinyl chloride monomer in processes for producing a polymer of vinyl chloride be prevented. It has been required that the vinyl chloride monomer which remains in the product polymer of vinyl chloride be reduced as much as possible from the viewpoint of the characteristics of the products when processing the polymer and also for the health of the operators. In order to remove the vinyl chloride monomer which remains in a polymer of vinyl chloride, various processes have been carried out. For example, removing the vinyl chloride monomer by stirring a slurry of the polymerization mixture under reduced pressure after the polymerization or by removing the vinyl chloride monomer which remains in the polymer by heating the polymer have been employed.

However, these methods have the disadvantages of low efficiency for removing vinyl chloride monomer or deterioration of the desirable characteristics of the polymer. It has been proposed to heat the polymer for a short time while maintaining a layer of water on the surface of the polymer in order to prevent the deterioration of the polymer while the vinyl chloride monomer is removed by the heating operation. However, this method is not very efficient even though the deterioration of the polymer can be prevented to a degree.

Accordingly, there is a need for a method of removing vinyl chloride monomer from a polymer with good efficiency and without deterioration of the polymer properties.

SUMMARY OF THE INVENTION

It is an object of the present invention to provide a method of removing vinyl chloride monomer which remains in a polymer of vinyl chloride at high efficiency without deterioration of the polymer.

The object of the present invention has been attained by providing a method of removing vinyl chloride monomer which remains in a polymer of vinyl chloride by irradiating the polymer with an electromagnetic wave which excites the vinyl chloride monomer.

DETAILED DESCRIPTION OF THE PREFERRED EMBODIMENTS

In the method of the present invention, an electromagnetic wave which excites the vinyl chloride monomer is used to irradiate a polyvinyl chloride homopolymer or copolymer of vinyl chloride so as to remove the vinyl chloride monomer which remains in the polymer or copolymer (hereinafter referred to as a polymer of vinyl chloride). The electromagnetic wave applied in the method of the present invention is an electromagnetic wave capable of exciting vinyl chloride monomer and includes waves having frequencies of 0.1 to 10,000 MHz (medium frequency, very high frequency, micro wave), especially very high frequency waves of 10 - 100 MHz. The electromagnetic wave used in the method of the present invention should have enough energy to excite the vinyl chloride monomer. The energy rate is usually in a range of 0.01 - 100, preferably 0.1 - 10 Watt per 1 $cm^3$ of the polymer and 1 - 100 Watt per 1 $cm^2$ of the irradiated area. The time of irradiation for applying the electromagnetic wave to the polymer for exciting the vinyl chloride monomer is in a range of about 0.1 - 60 minutes, preferably about 0.5 - 20 minutes.

The present invention can be conducted at atmospheric pressure, however, it is especially effective to irradiate with the electromagnetic wave under reduced pressure.

The polymers of vinyl chloride include polyvinyl chloride and copolymers of vinyl chloride with a comonomer. Said comonomer content can be up to 50 wt. %, preferably up to 20 wt. % and said comonomer can be any monomer copolymerizable with vinyl chloride such as vinyl acetate, ethylene, acrylic acids, methacrylic acid or derivatives thereof. The polymer can be produced by various polymerization methods such as suspension polymerization, vapor phase polymerization, emulsion polymerization, bulk polymerization or the like.

It is especially effective to irradiate with the electromagnetic wave a polymer containing moisture, such as a wet cake of the polymer. In accordance with the method of the present invention, vinyl chloride monomer which remains in the polymer can be effectively removed. In comparison with the conventional method of removing vinyl chloride monomer by heating of the polymer, the polymer treated according to the method of the invention undergoes remarkably less deterioration.

The products formed using polymers treated according to the present invention can be kept in high quality because of the lower thermal deterioration during the processing operation. The apparatus used for the method of the present invention may be simple, since irradiation of the vinyl polymer with electromagnetic waves may be easily accomplished.

Having generally described the invention, a more complete understanding can be obtained by reference to certain specific examples, which are included for purposes of illustration only and are not intended to be limiting unless otherwise specified.

EXAMPLES 1 - 3:

Vinyl chloride was polymerized by a conventional suspension polymerization method to obtain a slurry of polyvinyl chloride having an average polymerization degree of 1000. The slurry was dehydrated by a centrifuge to obtain a wet cake having a volatile matter of 24 wt. % and vinyl chloride monomer content of 6500 ppm. The wet cake was irradiated by each of electromagnetic waves having a frequency stated in Table 1, under atmospheric pressure in the case of Example 1 and a reduced pressure of 1000 mm $H_2O$ below atmospheric in the case of Examples 2 and 3. The conditions are stated in Table 1. The vinyl chloride monomer content and volatile matter content in the polymers at each of the operation times were measured. The results are shown in Table 1.

EXAMPLE 1

Electronic range frequency: 2450 MHz output: 500 Watt.

Sample: 10 g in a glass dish having a diameter of cm; a thickness of about 0.5 cm.

EXAMPLE 2

High frequency excitor: frequency: 62 MHz output: 1 K Watt.

(The high frequency excitor has a grounded electrode and an excitation electrode (20 cm × 20 cm) with a gap of 5 cm).

(A sample is disposed between the electrodes)

Sample: 40 g in a glass dish having a diameter of 15 cm; a thickness of about 2 cm.

EXAMPLE 3

High frequency excitor: frequency: 1 MHz output: 1 K Watt.

(The structure is same with that of Example 2)

Sample: The sample is same with that of Example 2

TABLE 1

| Operation time (min.) | Example 1 2450 MHz 500 W. VCM content (ppm) | Example 1 2450 MHz 500 W. volatile matter content (wt. %) | Example 2 62 MHz 1 KW VCM content (ppm) | Example 2 62 MHz 1 KW volatile matter content (wt. %) | Example 3 1 MHz 1 KW VCM content (ppm) | Example 3 1 MHz 1 KW volatile matter content (wt. %) |
| --- | --- | --- | --- | --- | --- | --- |
| 2 | 2100 | 12 | 55 | 18 | 5000 | 18 |
| 5 | 230 | 1 | 1 | 12 | 800 | 16 |
| 10 | 5 | 0.06 | | | 100 | 14 |

EXAMPLES 4 – 5

In accordance with the methods of Examples 1 and 2, wet cakes each having a volatile matter of 23 wt. % and a vinyl chloride monomer content of 8500 ppm obtained by centrifugal dehydration of a slurry of polyvinyl chloride having an average polymerization degree of 700 prepared by the suspension polymerization, was irradiated by each of the electromagnetic waves having frequency stated in Table 2 under the conditions stated in Table 2. The results are shown in Table 2, wherein in Example 4, the treatment was at atmospheric pressure, and in Example 5, the treatment under a reduced pressure of 1000 mm H₂O below atmospheric.

TABLE 2

| Operation time (min.) | Example 4 2450 MHz 500 W VCM content (ppm) | Example 4 2450 MHz 500 W volatile matter content (wt. %) | Example 5 50 MHz 1 KW VCM content (ppm) | Example 5 50 MHz 1 KW volatile matter content (wt. %) |
| --- | --- | --- | --- | --- |
| 2 | 3600 | 10 | 40 | 17 |
| 5 | 500 | 0.5 | 1 | 13 |
| 10 | 13 | 0.1 | | |

COMPARISON EXAMPLE 1

Into a 200 ml round bottom flask, 66 g of the wet cake of Example 1 was charged and the flask was connected to a rotary evaporator and the wet cake was heated at 60° C under a reduced pressure of 750 mmH₂O below atmospheric to dry the polyvinyl chloride.

The results are shown in Table 3.

TABLE 3

| Operation time (min.) | VCM content (ppm) | volatile matter content (wt. %) |
| --- | --- | --- |
| 15 | 5000 | 15 |
| 30 | 1000 | 8 |
| 45 | 800 | 3 |
| 60 | 600 | 1 |
| 75 | 400 | 0.1 |

COMPARISON EXAMPLE 2

In accordance with the method of Comparison Example 1 except heating of 80° C under a reduced pressure suction of 1000 mmH₂O below atmospheric, the wet cake was heated.

The results are shown in Table 4

TABLE 4

| Operation time (min.) | VCM content (ppm) | volatile matter content (wt. %) |
| --- | --- | --- |
| 15 | 3000 | 22 |
| 30 | 500 | 19 |
| 45 | 100 | 17 |
| 60 | 50 | 14 |
| 75 | 10 | 13 |

EXAMPLE 6

Each of the polyvinyl chloride samples obtained in Examples 1, 2 and Comparative 1, 2 was dried by irradiation with infrared rays. Each sample of the dried polyvinyl chloride was admixed with 3 wt. parts of dibutyltin-maleate and 1 wt. part of butyl stearate per 100 wt. part of polyvinyl chloride, the mixture was kneaded at 155° C for 10 minutes on a roller mill, and then was pressed at 185° C for 10 mins. The hues (color) of the samples were compared. On the other hand, the rolled sheet of each polyvinyl chloride was treated by a gear oven at 185± 2° C, for comparative tests of heat stability. The hue and heat stability were evaluated by observations under rating A, B and C.

TABLE 5

| | Frequency | Initial color* | Heat Stability |
| --- | --- | --- | --- |
| Example 1 | 2450 MHz | slightly colored B | excellent A |
| Example 2 | 62 MHz | white A | excellent A |
| Example 3 | 1 MHz | slightly colored B | excellent A |
| Example 4 | 2450 MHz | slightly colored B | excellent A |
| Example 5 | 50 MHz | white A | excellent A |
| Comparison Example 1 | | colored C | inferior B |
| Comparison Example 2 | | highly colored D | inferior B |

Note: *Initial color: color before treating by the gear oven.

The polyvinyl chloride used is one irradiated by the electromagnetic wave of each frequency for 5 mins.

EXAMPLE 7

A slurry of polyvinyl chloride having an average polymerization degree of 1000 which was produced by suspension polymerization, was dehydrated by a centrifuge to obtain a wet cake having a volatile matter of 22 wt. % and vinyl chloride monomer content of 5100 ppm. The wet cake was irradiated in a high frequency excitor which has a grounded electrode and an excitation electrode ($25^{cm} \times 25^{cm}$) and a gap of 70 mm. The sample was kept in a cylindrical frame having a diameter of 160 mm which was disposed on a silicon rubber sheet insulator.

The conditions and the results of the test are as follows.

|  | Frequency | 13 MH$_z$ |
|---|---|---|
|  | Input | 10 KWatt |
| Atmospheric | Sample | 300 g |
| Pressure |  | a thickness of about 42 mm |
| Operation time (min.) | VCM content (ppm) | volatile matter content (wt. %) |
| 0 | 5100 | 22 |
| 2 | 350 | 18 |
| 4 | 3 | 10 |

In accordance with the method of Example 6, the hue and heat stability were evaluated.

The results are as follows.

| Initial Color | A Excellent |
|---|---|

-continued

| Heat Stability | A Excellent |
|---|---|

Having now fully described the invention, it will be apparent to one of ordinary skill in the art that many changes and modifications can be made thereto without departing from the spirit of scope of the invention as set forth herein.

What is claimed as new and intended to be covered by Letters Patent is:

1. A method of removing vinyl chloride monomer which remains in a homopolymers or copolymers of vinyl chloride, which comprises irradiating said polymer of vinyl chloride with high energy electromagnetic radiation, having a frequency of 10–100 MHz, to excite said vinyl chloride monomer in said polymer thereby removing said vinyl chloride monomer.

2. The method of claim 1 wherein the energy of said radiation is 0.01–100 watts/cm$^3$.

3. The method of claim 1, wherein the irradiation is conducted under a reduced pressure.

4. The method of claim 1, wherein a wet cake of the polymer of vinyl chloride is irradiated by the electromagnetic wave to excite the vinyl chloride monomer.

* * * * *